March 25, 1924. Re. 15,802
W. A. SCOTT
ORE CONCENTRATION PROCESS
Original Filed Aug. 17, 1917
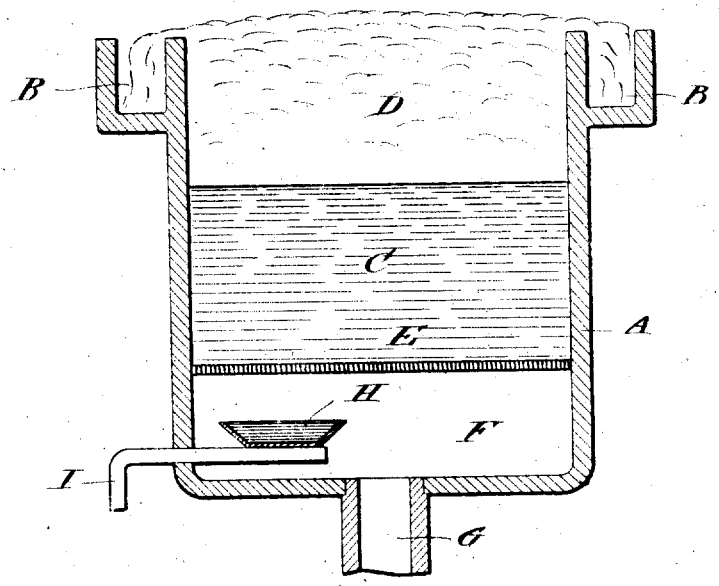
Inventor
Walter A. Scott
By Williams & Pritchard
Attorneys.

Reissued Mar. 25, 1924. Re. 15,802

UNITED STATES PATENT OFFICE.

WALTER A. SCOTT, OF CHICAGO, ILLINOIS, ASSIGNOR TO MINERALS SEPARATION NORTH AMERICAN CORPORATION, A CORPORATION OF MARYLAND.

ORE-CONCENTRATION PROCESS.

Original No. 1,246,665, dated November 13, 1917, Serial No. 186,666, filed August 17, 1917. Application for reissue filed February 1, 1919. Serial No. 274,527.

*To all whom it may concern:*

Be it known that I, WALTER A. SCOTT, a citizen of the United States, residing at Chicago, in the county of Cook and State of Illinois, have invented certain new and useful Improvements in Ore-Concentration Processes, of which the following is a specification.

My invention is an improved flotation process. In the flotation process as previously practised, as is well known, certain reagents or modifying agents generally termed oils, although many of such substances are not oils, are added to a freely flowing ore pulp whereupon the introduction of air or some other gas into the pulp gives rise to the formation of bubbles which collect the desired mineral, generally metalliferous sulfids, and reject the gangue. The modifying agents used for this purpose comprise a great variety of oils, animal, vegetable and mineral oils, coal and wood tar and derivatives thereof, various alcohols, hydroxyl compounds and other substances, all of which I refer to herein, for the sake of brevity, as oils. Air, of course, is the most available gas and the one generally used, but in referring to air herein I include all gases which have a similar action.

Heretofore the air necessary in the operation of the process has been introduced into the ore pulp either by mechanical agitation which has the effect of beating in the air from the atmosphere, or by introducing air into the pulp through a porous medium forming part of the vessel in which the pulp is contained. Detailed explanation of the flotation process as heretofore practised is unnecessary in view of the fact that the process is widely known and described in many patents and publications.

I have ascertained that the oil performs its principal, if not its only, function in the film surrounding the air bubbles and my invention consists in introducing the oil in such manner that it is supplied directly to the bubble films without the necessity of disseminating the oil through the entire body of ore pulp. My invention consists in using a volatile oil, impregnating the air with the gasified volatile oil, and introducing the gaseous mixture of air and oil into the pulp whereupon sufficient of the oil collects in the bubble films to effect the desired function. When operating according to my invention the necessity of mechanical agitation for the purpose of mixing the oil with the entire body of ore pulp is dispensed with and the amount of oil necessary for the purpose is greatly diminished in quantity by reason of the fact that the oil is applied directly to the bubble films where it is needed, without the necessity of distributing the oil throughout the body of the ore pulp in order to accomplish that purpose.

The drawing forming part of this application is a diagrammatic representation of means of applying my invention, and is a cross-sectional view of an apparatus designed for applying my invention by introducing the gaseous mixture of air and oil through a porous medium into the pulp.

In the figure A represents a containing vessel for the pulp, the same being provided with launders B into which the mineral bearing bubbles overflow. C represents the pulp contained in the vessel A and D the column of mineral bearing bubbles represented as filling the upper part of the vessel A and overflowing into the launders B. E is a porous medium spaced some distance above the bottom of the vessel A, this porous medium being composed of several layers of canvas or other fabric or of some other porous medium such as unglazed porcelain, or other substances. Between the porous medium E and the bottom of the vessel A there is an air space F into which air under pressure is introduced through the pipe G. The air pressure in the space F is sufficient to support the head of pulp in the vessel A and to force the air through the pores of the medium E. H is a vessel containing some volatile oil and I represent a steam coil for heating the same, if necessary.

In operation the air supplied through the inlet pipe G becomes impregnated with gasified modifying agent which vaporizes from the vessel H and the mixture of air and gasified oil penetrates the permeable medium E and rises as bubbles through the pulp C. The effect of this is to form the bubble column D above the pulp, the bubbles forming the bubble column having collected the metalliferous mineral during their passage through the pulp and subsequently being overflowed with the mineral into the launders B. The bubbles collected in the launders B may be broken down by any suitable means, as by a spray of water and the precipitated mineral collected as concentrate. The concentrate so collected may, as customary, be retreated to further purify it, if necessary.

While I have shown certain specific means for effecting the mixture of ore with gasified oil, it will be obvious that my invention is not restricted to the specific means shown, nor is my invention restricted to the use of any particular volatile oil. A variety of suitable substances are volatile and many others such as coal tar, and the coal tar products contain certain volatile constituents.

What I claim is:

1. An ore concentration process comprising the operations of vaporizing a modifying agent and forming a mixture thereof with air, introducing said mixture through a fine texture porous medium into an ore pulp and forming bubbles to which certain mineral particles in the ore adhere as said bubbles rise through the pulp, causing said mineral-bearing bubbles to form a column of bubbles above the pulp and separating the mineral carried by the bubbles in the upper part of the bubble column from the remainder of the ore.

2. An ore concentration process comprising the operations of vaporizing a modifying agent and forming a mixture thereof with air free from modifying agent in the liquid state, introducing said mixture into an ore pulp in the form of bubbles to which certain mineral particles in the ore adhere as said bubbles rise through the pulp, causing said mineral-bearing bubbles to form a column of bubbles above the pulp and separating the mineral carried by the bubbles in the upper part of the bubble column from the remainder of the ore.

3. An ore concentration process comprising the operations of vaporizing a modifying agent and forming a mixture thereof with air free from modifying agent in the liquid state, introducing said mixture through a porous medium into an ore pulp and forming bubbles to which certain mineral particles in the ore adhere as said bubbles rise through the pulp, causing said mineral-bearing bubbles to form a column of bubbles above the pulp and separating the mineral carried by the bubbles in the upper part of the bubble column from the remainder of the ore.

4. An ore concentration process comprising the operations of vaporizing a modifying agent and forming a liquid free mixture thereof with air, introducing said mixture into an ore pulp under pressure not substantially greater than that necessary to sustain the hydrostatic head of the pulp, thus forming bubbles which are impelled upwardly through the pulp by their buoyancy only and to which certain mineral particles in the ore adhere, causing said mineral-bearing bubbles to form a column of bubbles above the pulp, and separating the mineral carried by the bubbles in the upper part of the bubble column from the remainder of the ore.

5. An ore concentration process comprising the operations of vaporizing a modifying agent and forming a mixture thereof with air, introducing said mixture through a fine texture porous medium into an ore pulp under pressure not substantially greater than that necessary to sustain the hydrostatic head of the pulp and to overcome the resistance of the porous medium to the passage of the gaseous mixture thus forming bubbles which are impelled upwardly through the pulp by their buoyancy only and to which certain mineral particles in the ore adhere, causing said mineral-bearing bubbles to form a column of bubbles above the pulp, and separating the mineral carried by the bubbles in the upper part of the bubble column from the remainder of the ore.

6. An ore concentration process comprising the operations of exposing a body of liquid modifying agent having a relatively large exposed surface to a current of air thereby vaporizing part of said agent, introducing the mixture of air and vaporized modifying agent so formed free from any of such agent in liquid form into an ore pulp in the form of bubbles to which certain mineral particles in the ore adhere as said bubbles rise through the pulp, causing said mineral-bearing bubbles to form a column of bubbles above the pulp and separating the mineral carried by the bubbles in the upper part of the bubble column from the remainder of the ore.

7. An ore concentration process comprising the operations of exposing a relatively large surface of a liquid modifying agent containing a volatile constituent to a current of air thereby vaporizing part of said agent, introducing the mixture of air and vaporized modifying agent so formed free from any of such agent in liquid form into an ore pulp in the form of bubbles to which certain mineral particles in the ore adhere as said bubbles rise through the pulp, causing said mineral bearing bubbles to form a column of bubbles above the pulp and separating the mineral carried by the bubbles in the upper part of the bubble column from the remainder of the ore.

8. An ore concentration process comprising the operations of exposing a relatively large surface of heated liquid modifying agent to a current of air thereby vaporizing part of said agent, introducing the mixture of air and vaporized modifying agent so formed free from any of such agent in liquid form into an ore pulp in the form of bubbles to which certain mineral particles in the ore adhere as said bubbles rise through the pulp, causing said mineral-bearing bubbles to form a column of bubbles above the pulp and separating the mineral carried by the bubbles in the upper part of the bubble column from the remainder of the ore.

9. An ore concentration process comprising the operations of exposing a body of heated liquid modifying agent having a relatively large exposed surface containing a volatile constituent to a current of air thereby vaporizing part of said agent, introducing the mixture of air and vaporized modifying agent so formed free from any of such agent in liquid form into an ore pulp in the form of bubbles to which certain mineral particles in the ore adhere as said bubbles rise through the pulp, causing said mineral-bearing bubbles to form a column of bubbles above the pulp and separating the mineral carried by the bubbles in the upper part of the bubble column from the remainder of the ore.

10. An ore concentration process comprising the operations of introducing a mixture of a non-frothing gas and a frothing agent in the form of vapor into an ore pulp and forming fine bubbles to which certain mineral particles in the ore adhere as said bubbles pass through the pulp, causing said mineral-bearing bubbles to form a froth above the pulp and separating mineral carried by the bubbles in the froth from the remainder of the ore.

11. The process of concentrating ores which consists in mixing the powdered ore with water to form a pulp, introducing into the pulp simultaneously a large number of minute bubbles of a non-frothing gas carrying a frothing agent in gaseous form, allowing the bubbles to rise to the surface of the pulp to form a froth, and separating mineral carried by the froth from the remainder of the ore.

12. An ore concentration process comprising the operations of introducing a non-frothing gas carrying a frothing agent in gaseous form into an ore pulp and forming fine bubbles to which certain mineral particles in the ore adhere as said bubbles pass through the pulp, causing said mineral-bearing bubbles to form a froth above the pulp and separating mineral carried by the bubbles in the froth from the remainder of the ore.

13. The process of concentrating ores which consists in mixing the powdered ore with water to form a pulp, introducing into the pulp simultaneously a large number of minute bubbles of a non-frothing gas carrying a frothing agent in the form of vapor, allowing the bubbles to rise to the surface of the pulp to form a froth, and separating mineral carried by the froth from the remainder of the ore.

14. An ore concentration process comprising the operations of introducing a mixture of non-frothing gas and frothing agent in vapor form through a fine texture porous medium into an ore pulp and forming bubbles to which certain mineral particles in the ore adhere as said bubbles rise through the pulp, causing said mineral-bearing bubbles to form a column of bubbles above the pulp, and separating the mineral carried by the bubbles in the upper part of the bubble column from the remainder of the ore.

15. An ore concentration process comprising the operations of introducing a mixture of non-frothing gas and a frothing agent in gaseous form through a porous medium into an ore pulp from beneath and forming bubbles to which certain mineral particles in the ore adhere as said bubbles rise through the pulp, causing said mineral bearing bubbles to form a froth above the pulp and separating the mineral carried by the bubbles in the froth from the remainder of the ore.

16. An ore concentration process comprising the operations of introducing a mixture of non-frothing gas and a frothing agent in vapor form into an ore pulp and forming fine bubbles to which certain mineral particles in the ore adhere as said bubbles pass through the pulp, causing said mineral bearing bubbles to form a column of bubbles above the pulp and separating the mineral carried by the bubbles in the upper part of the bubble column from the remainder of the ore.

17. The process of concentrating ores which includes the operations of introducing a mixture of a non-frothing gas and a frothing agent in gaseous form into an ore pulp in the substantial absence of liquid oil, and forming fine bubbles to which certain mineral particles in the ore adhere as said bubbles pass through the pulp, causing said mineral bearing bubbles to form a froth above the pulp and separating the mineral carried by the bubbles in the froth from the remainder of the ore.

18. An ore concentrating process including the operations of introducing into an ore pulp fine bubbles of carburetted air to form a froth and separating the mineral carried by the bubbles in the froth from the remainder of the ore.

19. An ore concentrating process including the operations of introducing into an ore pulp fine bubbles of air to form a froth and separating the mineral carried by the bubbles in the froth from the remainder of the ore, and which further includes the use of a readily condensable hydrocarbon gas mixed with the air prior to its introduction.

20. An ore concentrating process including the operations of bringing into an ore pulp fine bubbles of air to form a froth and separating the mineral carried by the bubbles in the froth from the remainder of the ore, and which further includes the use of a readily condensable hydrocarbon gas mixed with the air prior to its introduction into the pulp.

21. An ore concentrating process including the operations of introducing into an ore pulp fine bubbles of air to form a froth and separating the mineral carried by the bubbles in the froth and which further includes the use of oil vapor mixed with the air prior to its introduction.

22. In a flotation process of ore concentration involving formation and separation of a mineral-bearing froth, the step which comprises introducing into an ore pulp fine bubbles of air carburetted with a readily condensable hydrocarbon gas under froth-forming conditions.

In testimony whereof I have hereunto subscribed my signature.

WALTER A. SCOTT.